Jan. 19, 1943.    R. C. DAVIS ET AL    2,308,963
CAM MECHANISM
Filed Oct. 10, 1940
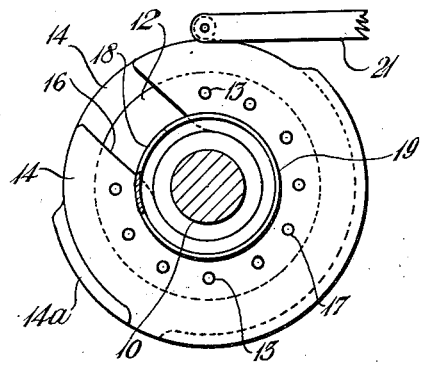
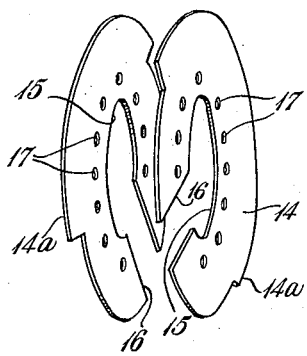
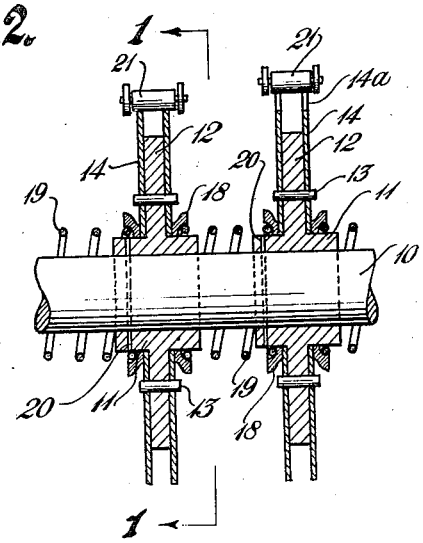
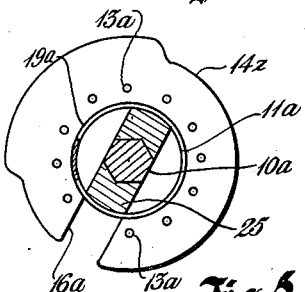
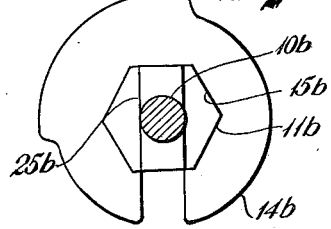
INVENTOR
Ralph C. Davis
and
Clarence W. Graham
BY
Ely & Frye
ATTORNEYS Patented Jan. 19, 1943

2,308,963

UNITED STATES PATENT OFFICE 2,308,963

CAM MECHANISM

Ralph C. Davis, Akron, and Clarence W. Graham, Cleveland, Ohio, assignors to The Firestone Tire & Rubber Company, Akron, Ohio, a corporation of Ohio Application October 10, 1940, Serial No. 360,526

10 Claims. (Cl. 74—568)

This invention relates to cam mechanisms, and more especially it relates to adjustable cams which can be easily adjusted, or varied.

The cam mechanisms are especially useful in association with a timing mechanism that controls the duration of the interval between successive operations to be performed in determinate sequence. The timing mechanism may be of simple construction and arranged solely to make electrical connections momentarily at determinate time intervals, whereby electrical energy is communicated to the controller to actuate the same. One example of such series of operations is in the vulcanization of pneumatic tire casings in the rubber industry, wherein heavy hydraulic pressure is used for closing the tire molds, steam pressure is used for heating the molds, and heated fluid under pressure is used for distending the tires within the molds. In such apparatus it is very desirable to use cams which can be easily adjusted without disassembling the apparatus appreciably as that simplifies changing the conditions of operation of any of the individual steps in the cycle.

The chief objects of the invention are to provide readily and easily adjustable cam mechanisms; to produce cams which can be changed without disassembling the apparatus with which they are associated; to provide cams that readily may be altered to vary the extent of their camming surfaces; and to provide cams that do not require to be accurate as to lift, thereby making it possible to produce the cams by a simple stamping operation. Other objects will be manifest as the specification proceeds.

Of the accompanying drawing:

Figure 1 is a vertical sectional elevation on line 1—1 of Figure 2;

Figure 2 is a sectional elevation of cam mechanism embodying the invention;

Figure 3 is a perspective view of the cam elements per se; and

Figures 4 and 5 are sectional elevations, similar to Figure 1, of modifications of the invention.

Referring in detail to the drawing, a cam shaft 10 is shown, which shaft is driven by any suitable means (not shown), so that one revolution of the cam shaft 10 constitutes a cycle of operation for the mechanism controlled thereby. Mounted upon the cam shaft 10 at points spaced longitudinally thereof are any desired number of cam supports, each of which comprises a hub portion 11 that is secured to the cam shaft by pins 20, and an integral, centrally disposed, outwardly extending circumferential flange 12 that has two pins or dowels 13, 13 mounted therein at diametrically opposite points, each of said dowels projecting laterally from the lateral faces of said flange. Mounted upon each hub 11 in laterally abutting relation to opposite lateral faces of its flange 12 are cam plates 14, 14. As shown in Figure 3, each of said cam plates 14 is formed with an axial aperture 15 of such diameter as to fit slidingly upon the hub 11, there being a radial slot 16 extending from the aperture 15 to the perimeter of the cam plate. Slot 16 is slightly wider than the diameter of cam shaft 10 so that the cam plates may be mounted by sliding them over the cam shaft until their apertures 15 are aligned with hubs 11, and then moving them axially until they are positioned upon the hubs, against flanges 12. Each cam plate is formed with a concentric series of apertures 17, 17 herein shown as 30 degrees apart and arranged to receive one or both dowels 13 projecting from the flange 12. The arrangement is such as to provide for mounting the cam plates in determinate angular positions relatively of the cam shaft and relatively of each other, and to prevent angular movement of the cam plates relatively of the cam shaft.

For restraining the cam plates 14 against axial movement upon the hubs 11, dished washers 18 are slidably mounted upon the latter and are yieldingly urged axially against the outer lateral face of each cam plate 14 by compression springs 19, 19 mounted upon the cam shaft and engaging the washers 18. Collars (not shown) may be mounted on the cam shaft at each end of the bank of cams for engagement with the compression springs that engage the end cam plates. The washers 18 may be moved axially, against the pressure of the springs 19, when it is desired to remove a cam plate or to alter the angular position thereof.

The two cam plates 14 on each hub 11 constitute a single cam element and operate as a unit upon a single instrumentality, such as a cam follower 21 which in turn controls a valve or other means (not shown) for controlling the operation of a remote instrumentality. Each cam plate shown comprises a raised peripheral camming surface 14a that is a little less than 180° in extent in one instance and about 45° in the other. Other cam plates having cam surfaces of various lengths less than 180° may be provided, and if the cam action desired is less than 180°, it is possible that camming action may be obtained by the use of but one cam plate. The arrangement is advantageous, however, in making it possible to obtain any length of cam action desired with relatively few cam plates. By making the camming surface of a cam smaller than that required in the apparatus, the proper cam surface can be obtained by use of a second cam which has a cam surface protruding beyond the first's the desired amount and by positioning two cam plates having a little less than 180° camming surface in non-alignment angularly, their combined camming surfaces 14 may be nearly 360° in extent. Where two cams are to be combined to form a cam surface, it sometimes is desirable to form the holes 17 in one of the cam plates after the first plate is positioned and the exact extent of additional camming surface required is determined.

The cam units described operate respective fluid pressure valves which have appreciable tolerances in their control and still operate satisfactorily. This construction is advantageous in that adjustment of the valve is provided, and extreme accuracy in the lift of the cam is not required.

The feature of having two cam plates constitute a single cam makes it possible to alter the device readily and to obtain any cam action desired. It will be seen that the individual cams can be readily and rapidly changed or adjusted without the use of tools and without loosening any part of the apparatus, or disassembling it in any manner. In general, the invention adapts inexpensive, easily produced cams to be suitable for any cam control desired.

Figures 4 and 5 show modified forms of cam and hub construction which are generally similar to that shown in Figures 1 through 3. In Figure 4, a hexagonal shaft 10a is provided and flanged hubs 11a are engaged therewith and supported thereby. The hubs 11a are abutted on the shaft 10a and have diametrically opposed side portions cut away to form substantially rectangular end sections 25 for the hubs. Cam plates 14z having center apertures and slots 16a formed therein are provided to be mounted on the hubs 11a. The cam plates are positioned by engaging the slots 16a with the end sections 25 of the hubs and slipping the cam plate radially onto the shaft after which the cam plate can be moved axially of the shaft until it abuts the flange of the hub on which it is mounted. The cam plates 14z are positioned on the hubs by dowel pins 13a and springs 19a as in the embodiment of the invention shown in Figures 1 through 3. Use of such pins is avoided in the cam mechanism of Figure 5. In this instance hubs 11b are mounted on a shaft 10b and may be longitudinally spaced thereon. The hubs 11b are of symmetrical, non-circular form and in this instance are hexagonal. The hubs are adapted to receive cam plates 14b by forming cut down end sections 25b over which the cam plates can be passed. These cam plates have a hexagonal center opening 15b, whereby the plates are held against arcuate movement with relation to the hubs 11b. Springs (not shown) extend between opposed cams carried on adjacent hubs to retain the cam plates in engagement with the hubs.

Modification may be resorted to without departing from the spirit of the invention or the scope of the appended claims.

What is claimed is:

1. Cam mechanism comprising a cam shaft, a hub thereon formed with a central flange, a pair of cam plates mounted upon the hub and abutting opposite lateral faces of said flange, each of said cam plates being formed with an axial aperture for receiving said hub and a slot extending from said aperture to the periphery of the plate, said slot being of such size as to admit the cam shaft so that the plates may be axially aligned with the hub when being mounted thereon, and means for retaining said plates in determinate angular position upon the hub.

2. A cam mechanism comprising a cam shaft, a hub thereon formed with a central radial flange, a pair of cam plates receivable upon said hub in laterally abutting relation to said flange, each of said cam plates having a central aperture therein and a slot formed therein extending from the central aperture to the periphery of the cam plate, to enable it to be slipped onto or off of said cam shaft readily, each of said cam plates also having a series of apertures formed therein, and studs projecting laterally from opposite lateral faces of the flange and selectively engageable in the said apertures in the cam plates for preventing angular movement of the latter relatively of the flange.

3. A combination as defined in claim 2 including yielding means normally urging the respective cam plates against the hub flange.

4. An adjustable cam mechanism comprising shaft means for supporting cams, hubs mounted on said means in longitudinally spaced relation, each of said hubs having a medially positioned flange extending therefrom, a cam plate having a limited camming surface thereon abutted against each side of said flanges, said camming surfaces being angularly offset from each other, said cam plates having radially directed slots formed therein extending from the center thereof to their edges and being adapted to pass said shaft means therethrough, pins carried by said flanges for engaging with said cam plates in any of a given number of positions and retaining them against rotational movement relatively of said flanges, and means extending between opposed cam plates and carried by adjacent hubs for urging said cam plates into engagement with said pins and said flanges, said last named means being readily temporarily removable to enable the position of a cam plate to be changed with relation to the hub mounting same or to enable substitution of cam plates.

5. An adjustable cam mechanism comprising shaft means for supporting cams, said shaft means having a flange extending substantially radially therefrom, a cam plate abutted against each side of said flange, said cam plates having radially directed slots formed therein extending from the center thereof to their edges and being adapted to pass said shaft means therethrough, retaining means carried by said flange for engaging with said cam plates in any of a given number of positions and retaining them against rotational movement relatively of said flange, and means associated with said shaft means for urging said cam plates into engagement with said retaining means and said flange, said last named means being readily temporarily removable to enable the position of a cam plate to be changed with relation to the hub mounting same or to enable substitution of cam plates.

6. An adjustable cam mechanism comprising shaft means for supporting cams, hubs mounted on said means in longitudinally spaced relation, each of said hubs having a flange extending therefrom, a cam plate abutted against each side of each of said flanges, said cam plates having radially directed slots formed therein extending from the center thereof to their edges and being adapted to pass said shaft means therethrough, and means extending between opposed cam plates carried by adjacent hubs for urging said cam plates into engagement with said flanges, said last named means being readily temporarily removable to enable the position of a cam plate to be changed with relation to the hub mounting same or to enable substitution of cam plates.

7. A cam mechanism as in claim 1 wherein the hub has a regular, non-circular periphery and the cam plates have a central aperture therein adapted to engage with said hub and prevent arcuate movement of the cam plate relatively of said hub.

8. Cam mechanism as in claim 1 wherein the hub has a reduced diameter section adapted to engage with the slots in the cam plates and allow engagement and disengagement of the cam plates relatively of said hub.

9. In a cam mechanism, the combination of a driven cam shaft, and a cam unit thereon, said cam unit comprising a hub having a protuberance thereon, a pair of cam plates in relative position on said hub and abutting opposite sides of said hub protuberance whereby said plates are spaced apart, said plates being formed with an axial aperture for said shaft and a slot by which the plates can readily be engaged with or disengaged from said shaft, and yieldable means normally urging said cam plates against the protuberance of said hub.

10. A cam mechanism of the class described, comprising a cam shaft, a hub having a non-circular periphery attached to said cam shaft, a pair of cam plates mounted on said hub and rotated thereby, said cam plates having apertures of a shape that cooperates with that of the non-circular hub whereby the plates are retained in non-rotatable relation with said hub, said cam plates having slots extending from their said apertures to the periphery thereof whereby the plates may be conveniently removed from said cam shaft hub without otherwise dismantling the said mechanism.

RALPH C. DAVIS.
CLARENCE W. GRAHAM.